United States Patent

[11] 3,553,346

[72] Inventor Louis J. Ballantyne
     Vero Beach, Fla.
[21] Appl. No. 830,478
[22] Filed June 4, 1969
[45] Patented Jan. 5, 1971
[73] Assignee Automated Building Components, Inc.
     Miami, Fla.
     a corporation of Florida
     Continuation-in-part of Ser. No. 779,069,
     Nov. 26, 1968.

[54] CABLE PROTECTOR
     16 Claims, 9 Drawing Figs.
[52] U.S. Cl. .................................................. 174/48,
                                                        174/135
[51] Int. Cl. .................................................. H01b 7/00
[50] Field of Search ........................................ 174/48,
                                   135; 85/11, 13, 49; 287/20, 92, LP

[56] References Cited
     UNITED STATES PATENTS
     324,310   8/1885   Dunn et al. ................... 85/49
     3,240,869  3/1966  Jureit ........................... 174/48X
     3,297,815  1/1967  Drettmann ................... 174/48

Primary Examiner—Lewis H. Myers
Assistant Examiner—D. A. Tone
Attorney—Le Blanc and Shur ABSTRACT: Disclosed is a protector plate, its method of manufacture, and protector plate assembly particularly adapted for protecting electric cables passing through the wood framework of a mobile home. The plate is stamped from sheet stock, preferably 16-gage galvanized mild steel, and bent to form perpendicular, horizontal and vertical legs. Extending from the horizontal leg are a pair of slender, elongated, naillike teeth adapted to be embedded in the base of a notch formed in a wall stud. The vertical leg is preferably hammered over to also engage the notch base and substantially encircle the cable to be protected.

3,553,346

INVENTOR
LOUIS J. BALLANTYNE

BY  LeBlanc & Shur

ATTORNEYS

INVENTOR
LOUIS J. BALLANTYNE

BY Le Blanc & Shur

ATTORNEYS

CABLE PROTECTOR

This application is a continuation-in-part of copending application Ser. No. 779,069, filed Nov. 26, 1968.

This invention relates to a protector plate and its method of construction, and more particularly to a plate for protecting electrical cables, transmission lines, and other conduits forming part of a building structure and is especially adapted for protecting electrical cables in mobile home constructions. he plate is substantially of L-shaped configuration, having a pair of integral teeth on the end of one of the legs and is constructed so that it may be punched out from continuous strip stock without a waste of any material. It may be used to bridge and maintain electrical lines routed through notched-out studs, thus assuring protection against accidental puncturing of the electrical lines or cables.

As is well known, a variety of service lines, including electrical wiring plumbing, and gas lines, as well as air conditioning and heating conduits, pass through the wooden framing and support structure of a house or building. These cables and conduits usually pass through the wall studding between the wall to suitable outlets providing service to the home owner or building tenant. Protector plates for preventing accidental damage to the electrical lines or conduits, such as puncturing by nails or screws, are disclosed in assignee's U.S. Pat. No. 3,240,869 and No. 3,350,501, as well as the above-identified copending application Ser. No. 779,069. The present invention is directed to a protector plate of the same general construction and which preserves many of the advantages of those plates while at the same time offering significant improvements in terms of a flush-mounting construction which may be cheaply manufactured from strip material without waste and which may be readily applied to the notch of a stud or other structural element to retain and protect the conduit covered by the plate.

Electrical cables and other conduits are usually run through the framework of the mobile home before the wall or wall covering material is put in place. As a result, they are subject to damage both during construction and subsequently, especially by being inadvertently punctured by a nail or other fastener when a wallboard or other covering is nailed or otherwise secured in place. Subsequent damage may also result with additions made to the interior of the home, such as when nails or fasteners are driven into the wall to support pictures, shelves, or other wall-mounted units.

The present invention is directed to a new protector plate which preserves the advantages of assignee's prior plates but at the same time makes it possible to manufacture at a minimum cost a unit which not only provides for flush mounting of the wallboard but at the same time provides improved protection for the cable passing through the wall stud or other structural element notched to receive the cable. Important features of the plate of this invention include its substantially reduced cost, improved protection of the cable on substantially three sides, ease of application, and its adaptability to notches which may vary in size from one structural element to the next.

In the present invention, strip sheet material, preferably of 16-gage mild steel and either uncoated or galvanized, is passed through a suitable die where the plates are cutout and bent by a single stamping operation in a continuous sequence to form a protector plate with integral elongated slender naillike teeth on one leg which engage the rear surface of the notch and securely retain the protector plate in place. Because of the unique configuration of the plate and teeth, no metal whatsoever is wasted. The teeth from one of the next adjacent plates leave a pair of slots in the respective ends of each plate in addition to the pair of projecting teeth in that end. The plate is bent over at an angle of approximately 90° to form an L-shaped configuration.

The plate is inserted into the notch of a wooden structure and with one or two blows of a manner the teeth are driven into the rear or base of the notch to tightly secure the plate in place. An electrical cable or conduit to be protected is then inserted into the notch adjacent the bight portion of the protector plate and then with a few taps of a hammer the vertical leg of the plate is preferably bent over such as to overlie the electrical wiring to secure it in place and to provide protection against subsequent damage on substantially three sides of the cable. The plate is completely received within the notch to provide for flush mounting of the wall cover or wallboard.

It is therefore one object of the present invention to provide a new and improved protector plate and protector plate assembly for use in the building of homes and similar applications to protect particularly electrical wiring and cables but also other conduits commonly passed through the wood framing of a home.

Another object of the present invention is to provide a protector plate particularly adapted for use in conjunction with the relatively light framing of mobile homes.

Another object of the present invention is to provide an improved and less costly method of manufacturing protective plates without occasioning any loss of metal during manufacture.

Another object of the present invention is to provide an improved protector plate which may be bent over to substantially surround the cable on three sides to provide improved cable or conduit protection.

Another object of the present invention is to provide a protector plate which may be simply and easily applied to the notch of a structural element, which is usable with notches varying in size and depth, and further which is wholly contained within the notch to permit flush mounting of the wall or wall covering in direct engagement with the wall studs or other framing elements to be covered.

Another object of the present invention is to provide an improved cable protector plate which is less expensive in that it is cheaper to manufacture than previous plates.

These and further objects and advantages of the invention will become more apparent upon reference to the following specification, claims, and appended drawings, wherein:

Figure 1:
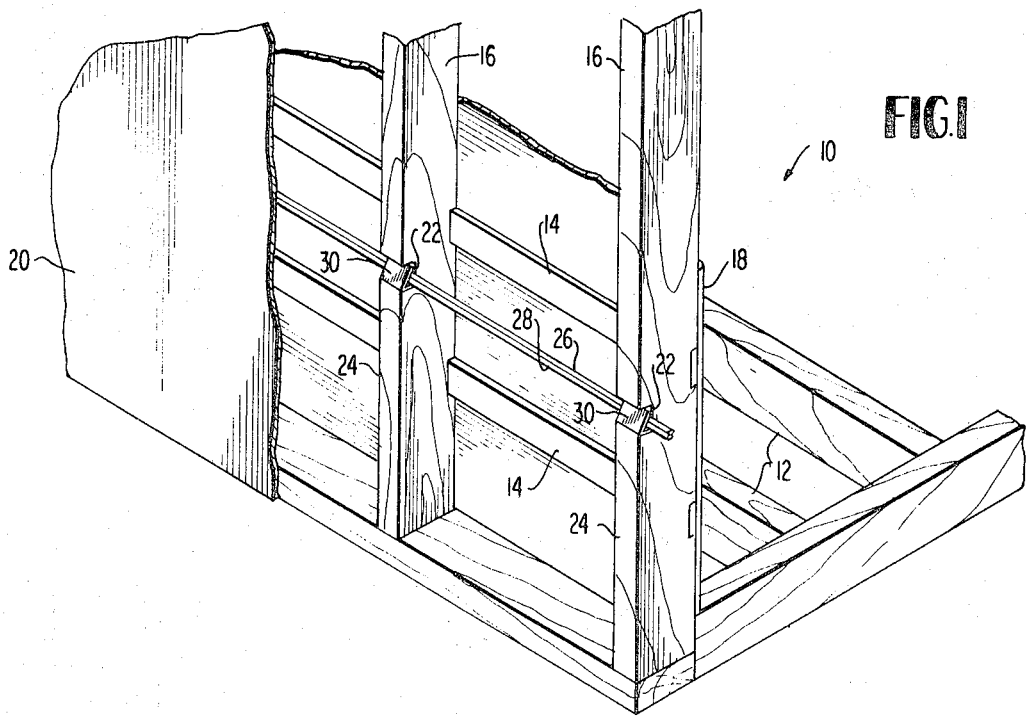
FIG. 1 is a perspective view, with parts in section, showing a portion of the framework for a mobile home with electrical cables protected by plates constructed in accordance with the present invention.

Referring to the drawings, FIG. 1 shows a wooden framework, generally indicated at 10, comprising a portion of a mobile home or house trailer including floor joists 12, wall stringers 14, and wall studs 16. The wall studs are illustrated as formed from pieces of 2×4 lumber and are adapted to be covered by interior wall paneling 18 and an exterior wall 20, which walls are conventionally nailed in place to the edges of the studs 16.

Each of the studs 16 is provided with a notch or dado 22 along its edge 24 and a pair of cables 26 and 28 are shown as passing through these notches, which cables carry electrical wiring for electric lights, cooking, and other equipment which may be provided in the mobile home. Secured in each of the notches is a protector plate 30 constructed in accordance with the present invention and shown in detail in FIGS. 2 through 9.

Figure 2:
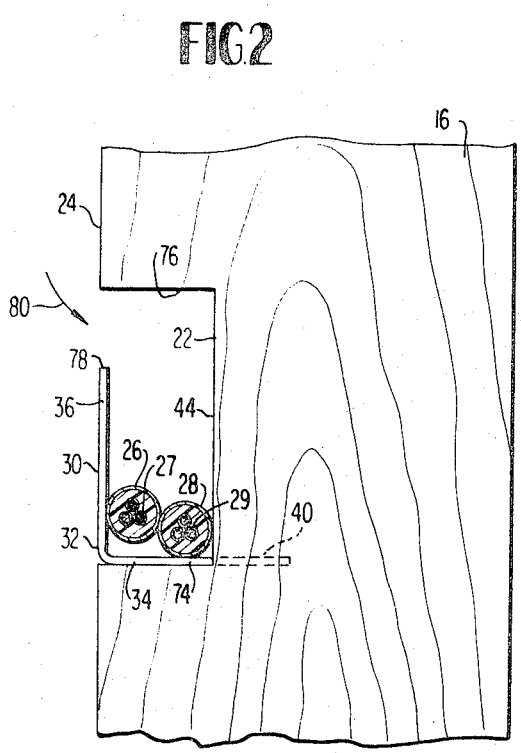
FIG. 2 is a cross section through the cables and one of the plates of FIG. 1 showing the protector plate in its initial position and wholly received within the notch of the support member.
Figure 4:
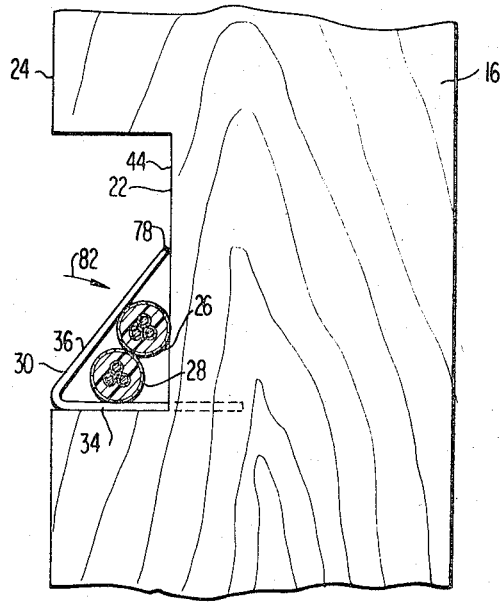
FIG. 4 is a view similar to FIG. 2 showing the vertical leg of the protector plate bent over to provide increased protection and to more surely retain the cables in the notch.
Figure 3:
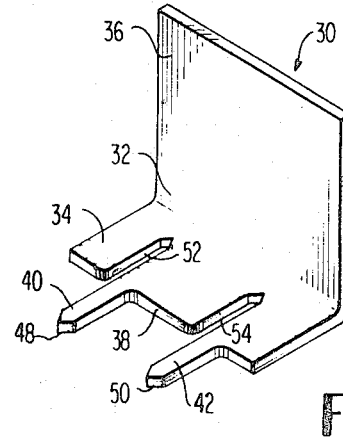
FIG. 3 is an enlarged perspective view of one of the cable protector plates of FIG. 1.

Referring to FIGS. 2—4, the cables 26 and 28 are of conventional construction and comprise a protective outer sheath filled with suitable insulation, which insulation surrounds and spaces a plurality of conductive wires or electrical leads 27 and 29. The protector 30 comprises a flat, generally rectangular metal plate, either uncoated or galvanized, which is bent between its ends at approximately a right angle as indicated at 32 to form an L-shaped configuration having legs 34 and 36. Plate 30 is conventionally made in different lengths to accommodate different size notches or dados, but in the embodiment shown leg 34 is approximately half the length of leg 36.

Figure 7:
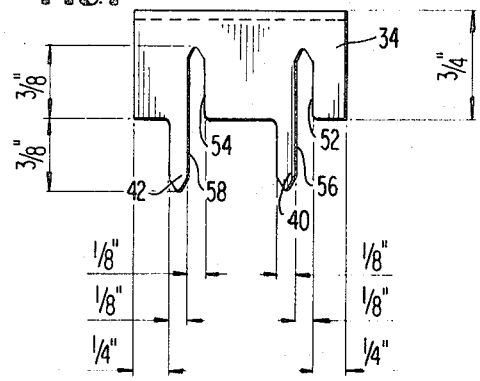
FIG. 7 is a bottom plan view of the plate of FIG. 5.
Figure 8:
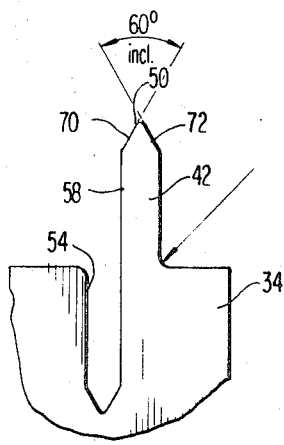
FIG. 8 is an enlarged view of one of the teeth and slots of the plate of FIG. 7.

Extending from the outermost edge 38 of leg 34 are a pair of slender elongated naillike teeth 40 and 42 which penetrate the back or base 44 of notch 22 as indicated by the dashed lines in FIG. 2. Edge 38 preferably engages the base of the notch 22 so that the teeth are completely embedded in the wood. Teeth 40 and 42 are coplanar and parallel and terminate in tapered ends or tips 48 and 50 to more readily penetrate the wood. Adjacent to teeth 40 and 42 in leg 34 are a pair of slots 52 and 54, which slots are left by the teeth formed in an adjacent plate in a manner more fully discussed below with respect to FIG. 9. The sides 56 and 58 of slots 52 and 54 form continuations of one edge of the respective teeth 40 and 42 as best seen in FIGS. 7 and 8.

Figure 5:
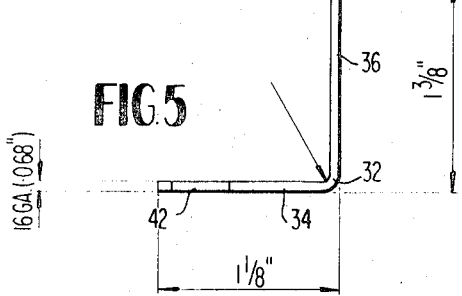
FIG. 5 is a side elevational view of the protector plate of FIG. 3.
Figure 6:
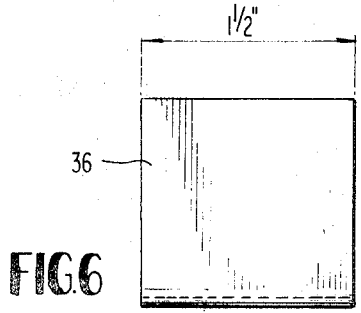
FIG. 6 is a rear elevation of the plate of FIG. 5.

FIG. 5 is a side elevation of plate 30 showing the bend or bight portion of the plate 32 forming the right-angled legs 34 and 36. The inside radius along the bend line, as illustrated in FIG. 5, is approximately one one-sixteenth inch. FIG. 6 is a rear view of the plate 30 showing the longer or vertical leg 36 which protects the cables and includes no perforations or apertures through which a nail or screw might otherwise gain access to the protected cables. FIG. 7 is a bottom plan view of the plate 30 showing the shorter leg 34 and FIG. 8 is an enlarged view of one of the teeth 42 and the companion slot 54.

In the preferred embodiment, the protector plate 30 is formed from strip stock of 16-gage mild steel and may be either uncoated or galvanized. It is preferred that the strip stock be provided with a hot-dip, galvanized coating to have a nominal thickness of 0.063 inch. That is, where resistance to weathering is necessary or desirable, it is necessary that the plate be provided with the galvanized coating. However, in situations where weather resistance is not a factor, then uncoated mild steel sheets may be used for forming the protector plate.

The dimensions given in the drawings are all in inches and are for sheet stock formed of 16-gage sheet metal provided with a hot-dip, galvanized coating and having a nominal thickness of 0.063 inch. If desired and where permitted, thicker or thinner materials may be employed and the dimensions modified accordingly. However, 16-gage material is preferred since it has adequate strength to resist penetration by nails or screws, and at the same time may be readily cut, stamped and bent to form the plates.

Figure 9:
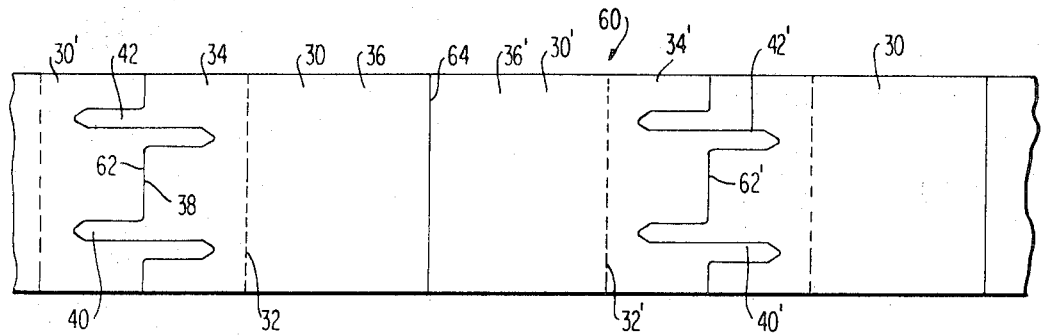
FIG. 9 shows a strip of metal with the patterns punched from it prior to bending and illustrates the savings in metal afforded by the plate of the present invention and the fact that no metal is wasted in forming the plates.

FIG. 9 illustrates the method of manufacturing the plate 30 and shows a strip of sheet metal 60 from which is punched the plate 30 and an adjacent plate 30', as well as other corresponding plates. Plate 30 is formed by cutting strip 60 along an irregular line, as indicated generally at 62, to form the edge 38 and projecting teeth 40 and 42. Strip 60 is also cut along a straight line 64 at right angles to the strip to form the complete plate 30. Legs 34 and 36 are formed by folding or bending leg 34 into the plane of the paper in FIG. 9 along the dashed fold or bend line 32. The cutting or punching of the individual plates from strip 60 may be done in a single operation along with the bending of the cut strip material along the bend line 32 or, alternatively, the plates may be first cut to length with the projecting teeth and then bent in a separate operation.

A corresponding plate 30' is also punched from the strip stock 60 and is formed by the straight cut 64 and the irregular cut 62' defining the teeth 40' and 42'. This plate is bent around the fold line 32' to form the short leg 34' and the long leg 36'. Again, the plate 30' is formed by bending one of the legs 34' or 36' into the plane of the paper in FIG. 9 to form the right-angled short leg 34' and long leg 36'. It is a feature of the present invention that the two plates 30 and 30', although punched with their teeth extending in opposite directions, are in fact of identical construction, and, when finally completed, take the form illustrated in FIG. 3 as do the remaining plates punched from strip stock 60.

If desired, strip 60 may be fed into a stamping, bending and cutting machine in incremental steps corresponding to the desired length from cut 62 to cut 62' to form a pair of plates in a substantially continuous operation of cutting and stamping plates in an efficient, economical manner and without any loss or waste of metal.

As best seen in FIG. 8, each of the teeth, such as the tooth 42 of that FIG., is of slender, elongated, naillike configuration so as to provide adequate withdrawal resistance such that the teeth of the plate, when embedded into the base of the stud notch, will not readily loosen and withdraw from the wood. The tooth is provided with a pair of bevels defining a taper such that beveled edges 70 and 72 form an angle of 30° with the longitudinal axis of the tooth. That is, if the surfaces of the bevels 70 and 72 were extended, they would intersect at a 60° included angle as illustrated in FIG. 8. The extreme tip 84 of the end of the tooth is slightly blunted.

In using the protector plates 30, they are customarily first inserted into a notch or dado 22, as illustrated in FIG. 2, and with a few taps of a hammer against vertical leg 36 adjacent the curved or bight portion 32 of the plate, the teeth 40 and 42 are driven into the base 44 of the notch. It is preferred that the protector plate be inserted so that horizontal leg 34 rests on the bottom 74 of the notch to provide additional support. Notch 22 is preferably of sufficient depth so that the entire plate 30 is received within the notch to provide for a flush mounting of the wallboard or cover on the front surface 24 of stud 16. The electrical cables 26 and 28 may then be inserted through the spacing between the top surface 76 of the notch and the edge 78 of vertical leg 36 as indicated by the arrow at 80 in FIG. 2. The cables normally rest on or adjacent to the shorter, horizontal leg 34 of the plate and are well protected against being inadvertently damaged by nails or screws driven into the front face 24 of the stud.

For increased protection and better retention of the cables 26 and 28 in the notch, vertical leg 36 may be bent over with a few additional blows of the hammer, as indicated by the arrow 82 in FIG. 4, so that the edge 78 of leg 36 rests against base 44 of the notch. By so bending over leg 36, cables 26 and 28 are completely captive between legs 34 and 36 and the cooperating portion of the base 44 of the notch so that the cables 26 and 28 are positively enclosed and retained in the notch. In this way, their likelihood of dropping out or working loose of the notch during construction of the wall is minimized. In addition, the bent over plate provides protection on substantially three sides of the cable with the only side of the cable unprotected by the plate being that defined by the vertical backwall or base 44 of the notch. 16-gage sheet metal formed from mild steel possesses the required flexibility so that leg 36 can be readily bent over in the manner illustrated in FIG. 4 by the cable installer through a few blows of a hammer on vertical leg 36 adjacent its upper end 38 until this end is driven into engagement with the base of the stud notch.

As illustrated in FIG. 7, the overall width of the protector plate 30 is preferably 1½ inches. This is dictated primarily by the finished narrower dimension of the 2 ×4 lumber customarily used for the studs 16. However, the protector plate of this invention is customarily manufactured in different lengths by simply changing the space between the cutting edges of the cutting machine so as to lengthen the overall plate. That is, where larger conduits or a greater number of cables are utilized, the size of the notch 22 is modified accordingly and the protector plate of the present invention can be provided with legs of different lengths to accommodate the particular size of the cables or conduits to be protected.

Customarily only the length of the legs 34 and 36 is varied with the width of the plate and dimensions of the teeth and slots remaining the same. In each case, the lengths of the legs 34 and 36 is preferably chosen so that the protector plate is wholly received within the notch to permit flush mounting of the wall covering material to the front surface of the stud.

It is apparent from the above that the present invention provides an improved protector plate particularly suited for protecting electrical cables and electrical lines from penetration by nails or other fastening devices and is especially suited for use with the light framing of mobile homes. As is readily apparent, however, the protector plate of the present invention can be used in any environment where it is desired to protect notch-mounted conduits from damage. The size and configuration of the teeth is such that the plate may be quickly and simply installed by inserting it into a notch and the teeth driven into the notch with a few taps of a hammer. The teeth are of slender, elongated, naillike configuration so as to provide substantial withdrawal resistance. In this way, the plates are securely retained in the notch and will not work loose even over prolonged periods as the wood dries out and tends to shrink. It is an important feature of the present invention that the protector plates require a minimum of metal as is especially evident from the stamping and cutting pattern illustrated in FIG. 9, and, furthermore, may all be formed of identical construction from rectangular sheet strip stock without any loss or waste of metal. Since the metal from which the plate is made is an important factor in the overall plate cost, the substantial savings in metal afforded by the protector plate and its method of fabrication according to this invention provides a significant reduction in the overall cost of the protector plate.

We claim:

1. A cable protector comprising a flat rectangular plate curved to form an L-shaped cross section having perpendicular first and second legs joined by an integral bight portion, and at least one tooth extending from the outer end of one of said legs.

2. A cable protector according to claim 1 comprising a pair of teeth extending from the outer end of one of said legs.

3. A cable protector according to claim 1 wherein one of said legs is shorter than the other, said tooth extending from said shorter leg.

4. A cable protector comprising a rectangular metal plate including substantially perpendicular long and short sides joined by an integral bent portion, and a pair of teeth integral with said short side of said plate, said teeth extending outwardly from the edge of said short side of said plate remote from said bent portion of said plate.

5. A cable protector according to claim 4 wherein said short side of said plate includes a slot adjacent each tooth, each slot being left by a corresponding tooth in a similar plate.

6. A cable protector according to claim 5 wherein said plate is galvanized.

7. A cable protector according to claim 5 wherein said plate is at least as thick as 16-gage metal.

8. A cable protector comprising a flat rectangular plate of 16-gage metal bent at a right angle to form short and long legs, a pair of spaced integral teeth coplanar with said short leg and extending from the edge of said short leg remote from said long leg, said teeth being slender and naillike, said short leg having a pair of slots left by corresponding teeth in a similar plate.

9. A method of forming protector plates from strip stock comprising cutting a strip of rectangular stock along irregular transverse lines at equally spaced points along the length of said stock to form teeth and slots, cutting said stock along a first straight transverse line intermediate said irregular transverse lines, and bending each cut section of stock at a right angle about a second straight transverse line intermediate said irregular line and said first transverse line.

10. A method according to claim 9 wherein said stock is cut along first transverse lines exactly midway of said irregular lines and is bent along second transverse lines closer to said irregular lines.

11. A protector plate assembly comprising a building structure element having a notch therein, a service line passing through said notch, and a protector plate received in said notch, said protector plate comprising a flat rectangular plate curved to form an L-shaped cross section with first and second legs joined by an integral bight portion overlying said service line, one of said legs including at least one coplanar tooth embedded in the base of said notch.

12. An assembly according to claim 11 wherein said other leg of said plate is bent over with its edge engaging the base of said notch to substantially completely enclose said service line.

13. A protector plate assembly comprising a vertical wooden stud having a rectangular notch therein, an electrical service line passing through said notch, and a protector plate wholly received in said notch over said service line to permit flush mounting of a wall to said stud, said plate comprising a solid rectangular metal plate including a substantially horizontal short side and a substantially vertical long side joined by an integral bent portion, said short side including a pair of integral coplanar teeth embedded in the base of said notch.

14. An assembly according to claim 13 wherein said vertical side is bent inwardly of said notch to overlie said electrical service line.

15. An assembly according to claim 13 wherein said plate has a width of about 1.5 inches.

16. An assembly according to claim 13 wherein said teeth have an overall length of approximately three-eighths inch.